No. 821,810. PATENTED MAY 29, 1906.
R. C. LIVESAY.
SPEED CHANGING MECHANISM FOR GRAIN DRILLS.
APPLICATION FILED FEB. 17, 1906.
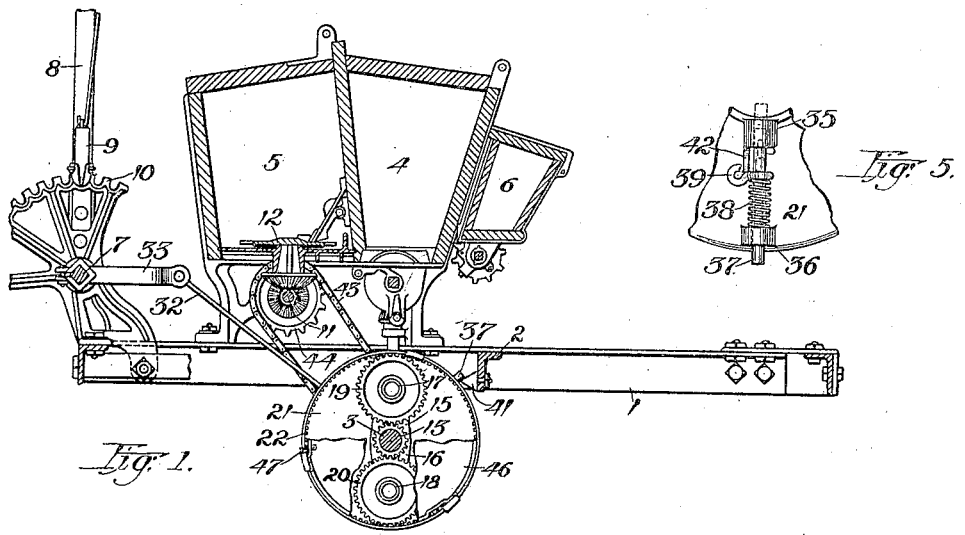

UNITED STATES PATENT OFFICE.

ROBERT C. LIVESAY, OF HAMILTON, CANADA, ASSIGNOR TO INTERNATIONAL HARVESTER COMPANY, A CORPORATION OF NEW JERSEY.

SPEED-CHANGING MECHANISM FOR GRAIN-DRILLS.

No. 821,810. Specification of Letters Patent. Patented May 29, 1906.

Application filed February 17, 1906. Serial No. 301,553.

*To all whom it may concern:*

Be it known that I, ROBERT C. LIVESAY, a citizen of the United States, residing at Hamilton, in the county of Wentworth and Province of Ontario, Canada, have invented certain new and useful Improvements in Speed-Changing Mechanism for Grain-Drills, of which the following is a specification, reference being had to the accompanying drawings, forming a part thereof.

My invention relates to speed-changing mechanism for grain-drills, and is particularly applicable in connection with a fertilizer-distributer when used as an attachment for the above class of machines, as shown in Patent No. 788,706, issued May 2, 1905, to E. J. Corser, the invention being an improvement upon the mechanism therein described, the object of the invention being to provide a mechanism for changing the speed of the distributing devices, having few parts and simply and cheaply constructed. I attain this object by the mechanism illustrated by the accompanying drawings, in which—

Figure 1 represents an end view, partly in section, of so much of a grain-drill as is thought sufficient to illustrate the application of my invention. Fig. 2 is a partial plan view of the machine-frame and the speed-changing mechanism mounted thereon. Fig. 3 is a sectional elevation of parts thereof. Fig. 4 represents a side elevation of the gear-case and controlling parts, and Fig. 5 is a detail of the clutch mechanism between the disk and sleeve.

Similar reference characters denote similar parts throughout the several views.

1 represents a part of the wheel-frame of the machine, 2 one of the cross members thereof, and 3 is the axle upon which the frame is supported.

4 represents the grain-hopper, 5 the fertilizer-hopper, and 6 the grass-seed hopper, all mounted upon the main frame. In rear of the hopper is a rock-shaft 7, and a hand-lever 8 is secured thereto in any approved manner, and the detent 9 is operative in combination with the toothed sector 10 to hold it in any desired position of adjustment, the primary function of the lever being to rock the shaft 7, and thereby adjust the furrow-openers to a higher or lower plane in the well-known way.

The mechanism for distributing the grain forms no part of my invention and may be of any approved form.

11 represents a shaft longitudinally arranged below the fertilizer-hopper, and connected therewith and driven thereby are the distributers 12, only one being shown.

Secured to the axle 3 is a pinion 13, and rotatably mounted thereon is a sleeve 14, having radially-extending arms 15 and 16 at one end thereof, having bearings 17 and 18 adapted to receive pinions 19 and 20, meshing with the fixed pinion 13 upon opposite sides thereof, and rotatably mounted upon the sleeve 14 is a disk 21, having a peripheral internal toothed rim 22, with which the pinions 19 and 20 are in mesh also. The opposite end of the sleeve 14 is provided with clutch-teeth 23, and slidably mounted upon the axle adjacent the sleeve is the sprocket-wheel 24, having at one end of its hub portion clutch-teeth 25, adapted to engage with the teeth upon the sleeve, and at its opposite end with a counterbore 26, designed to receive one end of a coiled spring 27, surrounding the axle and operative between the wheel 24 and a collar 28, secured to the axle, to hold the two sets of clutch-teeth in operative engagement. For the purpose of separating the clutch members the sleeve 14 and the hub of the sprocket-wheel are provided with peripheral flanges 29 and 30, and operative between the flanges is the forked end 31 of a bar 32, that has its opposite end connected with a crank 33, secured to the rock-shaft 7, the fork members of the bar having laterally-inclined cam-surfaces 34, that operate upon opposite sides of the axle to separate the clutch members when moved in one direction by the rocking action of shaft 7 in a well-known way.

Mounted in laterally-projecting ears 35 and 36, forming part of the disk 21, is a sliding bolt 37, having a coiled spring 38 surrounding it and operative between the ear 36 and the key 39 to slide the bolt radially toward the axis of the sleeve in a manner to engage with clutch-teeth 40 upon the periphery of the sleeve 14 and to cause the disk 21 to revolve with the sleeve when so engaged.

Secured to the frame member 2 is a stop-block 41, and when the sliding bolt 37 is moved outward it will contact with the block and secure the disk against rotation, as shown in Figs. 1 and 2, and when in this position the bolt is held against the force of the spring 38 by being rotated in its bearings until the key 39 engages with the longitudinally-projecting ear 42 at one side thereof, as shown in Figs. 2 and 5. A sprocket-chain 43 connects the sprocket-wheel 24 with the sprocket-wheel 44 upon the distributer-shaft and transmits motion thereto. 46 is a gear-cover rotatably mounted upon the hub of the fixed pinion and is secured to the disk 21 by means of the key 47, as shown in Fig. 1.

The device operates in the following manner: The pinion 13 revolves with the axle and through its engagement with the pinions 19 and 20 will either cause them to rotate about their bearings on the arms 15 and 16 of the sleeve 14 or will cause the sleeve 14 to revolve in unison therewith, dependent upon whether the disk 21 is clutched with the sleeve or is held against rotation and unclutched from the sleeve. With the disk 21 and sprocket-wheel 24 clutched with the sleeve 14 they will all be driven in unison with the fixed pinion 13. When it is desired to give the sprocket-wheel a slower rate of speed, the disk 21 is unclutched from the sleeve 14, and the bolt 37, contacting with the stop-block 41, prevents the disk from rotating, and the pinions 19 and 20, being caused to rotate through their engagement with the pinion 13, will, in turn, from their engagement with the teeth upon the rim of the disk 21, cause the sleeve 14 to rotate upon its axis, but at a reduced speed proportionate with the number of teeth upon the fixed pinion 13 and the rim of the disk 21, the gearing comprising a form of what is commonly called the "planetary system."

What I claim as my invention, and desire to secure by Letters Patent, is—

1. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon the sleeve and having an internal toothed rim, pinions mounted upon said arms and meshing with said fixed pinion and said toothed rim, clutching mechanism operative between said disk and sleeve, and motion-transmitting means connected with said sleeve and said driven shaft.

2. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon the sleeve and having an internal toothed rim, pinions mounted upon said arms and meshing with said fixed pinion and said toothed rim, clutching mechanism operative between said disk and sleeve comprising a sliding bolt mounted upon the disk and adapted to engage with the sleeve, and motion-transmitting means connected with said sleeve and said driven shaft.

3. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon the sleeve and having an internal toothed rim, pinions mounted upon said arms and meshing with said fixed pinion and said toothed rim, clutching mechanism operative between said disk and sleeve and between said disk and a fixed part of the machine, means for adjusting said clutch mechanism in a manner to engage the disk with said sleeve or with a fixed part of the machine, and motion-transmitting means connected with said sleeve and said driver shaft.

4. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon the sleeve and having an internal toothed rim, pinions mounted upon said arms and meshing with said fixed pinion and said toothed rim, clutching mechanism operative between said disk and sleeve and between said disk and a fixed part of the machine comprising a sliding bolt mounted upon said disk and adapted to engage with either the sleeve or a fixed part of the machine, and motion-transmitting means connected with said sleeve and said driven shaft.

5. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon said sleeve and having an internal toothed rim, pinions mounted upon said arms and meshing with said fixed pinion and said toothed rim, clutching mechanism operative between said disk and sleeve comprising a spring-pressed bolt slidably mounted upon the disk, one or more teeth upon the sleeve adapted to engage with one end of the spring-pressed bolt, and motion-transmitting means connected with said sleeve and said driven shaft.

6. A speed-changing mechanism for grain-drills comprising, in combination, a driving and a driven shaft, a pinion secured to the driving-shaft, a sleeve rotatably mounted on said driving-shaft and having radially-projecting arms, a disk rotatably mounted upon said sleeve and having an internal toothed rim, pinions mounted upon said arms and meshing with said fixed pinion and said toothed rim, clutching mechanism operative between said disk and sleeve and between said disk and a fixed part of the machine comprising a spring-pressed bolt slidably mounted upon said disk, one or more teeth upon the sleeve adapted to engage with one end of the spring-pressed bolt, means for disengaging said bolt from said sleeve and engaging it with a fixed part of the machine, and motion-transmitting means connected with said sleeve and said driven shaft.

7. A speed-changing mechanism for grain-drills comprising, in combination, a main frame member, a driving and a driven shaft, a pinion secured to the driving-shaft, a sleeve rotatably mounted upon said driving-shaft and having radially-projecting arms, a disk rotatably mounted upon said sleeve and having an internal toothed rim, pinions mounted upon said arms and meshing with said fixed pinion and said toothed rim, clutching mechanism operative between said disk and sleeve comprising a spring-pressed bolt slidably mounted upon the face of said disk and arranged radially relative to the sleeve, one or more teeth upon the sleeve adapted to engage with one end of the spring-pressed bolt, a stop-block secured to said frame member, means for disengaging said bolt from said sleeve and engaging it with said stop-block, and motion-transmitting means connected with said sleeve and said driven shaft.

8. A speed-changing mechanism for grain-drills comprising, in combination, a main frame member, a driving and a driven shaft, a pinion secured to the driving-shaft, a sleeve rotatably mounted upon said driving-shaft and having radially-projecting arms, a disk rotatably mounted upon said sleeve and having an internal toothed rim, pinions mounted upon said arms and meshing with said fixed pinion and said internal toothed rim, clutching mechanism operative between said disk and sleeve comprising a spring-pressed bolt slidably and rotatably mounted in laterally-projecting ears upon the face of said disk and arranged radially relative to said sleeve, one or more teeth upon the sleeve adapted to engage with one end of the spring-pressed bolt when it is moved in one direction, a stop-block secured to said frame member and adapted to engage with said bolt when it is moved in an opposite direction, means for adjusting said bolt toward said block, and motion-transmitting means connected with said sleeve and said driven shaft.

9. A speed-changing mechanism for grain-drills comprising, in combination, a main frame member, a driving and a driven shaft, a pinion secured to the driving-shaft, a sleeve rotatably mounted upon said driving-shaft and having radially-projecting arms, a disk rotatably mounted upon said sleeve and having an internal toothed rim, pinions mounted upon said arms and meshing with said fixed pinion and said toothed rim, clutching mechanism operative between said disk and sleeve comprising a bolt slidably and rotatably mounted in laterally-projecting ears integral with said disk, said bolt being arranged radially relative to said sleeve, one or more teeth upon said sleeve adapted to engage with one end of said bolt when moved in one direction, a laterally-projecting pin connected with said bolt, a coiled spring surrounding said bolt and operative between one of said ears and said pin to press the bolt toward the sleeve, an ear arranged at one side of said bolt and adapted to contact with said pin in a manner to hold the bolt in its adjusted position when the bolt is moved longitudinally away from the sleeve and rotated upon its axis.

In witness whereof I hereto affix my signature in presence of two witnesses.

ROBERT C. LIVESAY.

Witnesses:
A. L. JOHNSON,
ARNT W. ESSMAN.